United States Patent
Funk, Jr.

[15] 3,641,675
[45] Feb. 15, 1972

[54] OPTICAL ALIGNMENT SYSTEM
[72] Inventor: Buford H. Funk, Jr., 213 Wingate Ave., S.W., Huntsville, Ala. 35801
[22] Filed: July 14, 1969
[21] Appl. No.: 841,443

[52] U.S. Cl. ..........................33/46 R, 33/46 A, 33/46 AS, 33/46 G, 356/247
[51] Int. Cl. ..........................F41g 1/00, F41b 5/00
[58] Field of Search ..........33/46 A, 46 R, 46 AS, 46 G, 33/63, 64 R; 356/140, 142, 247

[56] References Cited

UNITED STATES PATENTS

| | | | |
|---|---|---|---|
| 1,851,189 | 3/1932 | King | 33/52 |
| 2,192,148 | 2/1940 | Otto | 33/223 |
| 3,346,962 | 10/1967 | Luebkeman | 33/52 |

*Primary Examiner*—Leonard Forman
*Assistant Examiner*—Steven L. Stephan
*Attorney*—C. A. Phillips

[57] ABSTRACT

An alignment system employing a round, transparent cylinder with indices marked on diametrically opposite surfaces, which when viewed at an angle to the surface provide a magnified indication of coincidence or proximity to coincidence of the eye with a plane of symmetry through the longitudinal axis of the cylinder and indices.

18 Claims, 11 Drawing Figures

PATENTED FEB 15 1972 3,641,675

Buford H. Funk Jr.
INVENTOR.

BY
C. A. Phillips
ATTORNEY

Buford H. Funk Jr.
INVENTOR.

PATENTED FEB 15 1972 3,641,675

Buford H. Funk Jr.
*INVENTOR.*

BY

*C. A. Phillips*
ATTORNEY.

Buford H. Funk Jr.
INVENTOR.

OPTICAL ALIGNMENT SYSTEM

This invention relates to a system for positioning objects in space and particularly to a system for optically positioning a viewing object, such as the eye, within a plane, along a line, or at a point in space relative to the position of a reference or references.

It will be readily appreciated that there are many instances wherein it is desired or necessary to locate or position ones self or an inanimate structure in space with respect to some other body or object and wherein there exists a line-of-sight relationship between them. While the invention has particular application to visual alignment by use of ones' eye, such is not necessarily the case as the viewing instrumentally may be a photoelectric device.

The invention is particularly directed to applications wherein alignment apparatus is now unavailable, of excessive cost or of insufficient capability to meet the need. An example of the last category exists in the sporting equipment field and particularly with respect to archery bows. In the case of archery bows, whether equipped with a sight or not, the very geometry of the bow prevents complete alignment between the archer, his bow, and the target because of the facet that even though equipped with a sight or sights, up until now there has been no available means of conveniently positioning a stable sight or other fixed reference at a position adjacent the eye, the drawn end of an arrow and bowstring all at the same place. There is simply no stable point on the bow which is in a position to be proximate the eye at the time of a shot. Thus, unlike a rifle which has a rear sight in addition to a front sight, the archery bow has had no effective means of providing a rear sight.

Another application of the present invention in the sporting equipment field is to golf clubs. No means are known to exist which provide for maintaining a particular alignment between the head of the golf club and the eye of the golfer for repeated swings of the club.

Accordingly, a principal object of this invention is to provide an improved optical alignment system of general applicability.

A further object of this invention is to provide an alignment system capable of use with sporting equipment such as an archery bow wherein the eye of an archer may be precisely and uniformly positioned with respect to the bow before drawing of the bow and at the time of release of an arrow. The significance of this achievement is to enable the archer, having once determined a desired eye position with respect to the bow for greatest accuracy, to reposition his eye at that same precise point thereafter, thus substantially improving the consistency of his shooting.

It is a further object of this invention to provide an improved bow alignment indicator which can be used with or without a bow sight.

It is still a further object of this invention to provide an indicator of torque applied to the bow, enabling the archer to prevent torquing effects and thus to reduce windage dispersion of his shots.

The significance of this facet of the invention is that the applicant knows of no other device available which performs the same function. Bow torque is of major concern and to such an extent that special designs including small handles with rotational degrees of freedom and stabilizing rods have been recently introduced. None, however, actually indicate bow torque.

It is a still further object of this invention to provide a reference from which the archer can precisely position his bow and head relatively to the target prior to drawing the string, such that movements of the body and bow are minimized from beginning of draw until release, enabling reductions in dispersions in all directions.

In accordance with the invention an alignment indicator or an alignment system is constructed employing one or more alignment assemblies or alignment reference units. An alignment assembly is made of an elongated cylinder of transparent material. The cylinder may be round or it may have other surface configurations, it being required only that it have a curved region on one of two opposite sides of the cylinder. A first index marking is applied to, or in some fashion made to appear in, a region on one side of the cylinder and a second index is similarly arranged in or on a diametrically opposed curved surface, the indices being symmetrically arranged with respect to a plane of symmetry of the cylinder through the longitudinal axis of the cylinder.

With a single alignment assembly, a viewer, observing the cylinder from a position wherein his eye forms with the surface of the cylinder an angle greater than about 10°, may readily position his eye in space within the plane of symmetry of the cylinder. As a feature of this invention, he is aided by virtue of the magnification characteristic of the alignment assembly, which while varying in magnitude with different angles of viewing, achieves a substantial magnification in the range from about 10° to 90°.

With the addition of a second alignment assembly spaced from the first alignment assembly and appropriately oriented, the eye of a viewer observing both alignment assemblies can be readily positioned within the planes of symmetry of both alignment assemblies and thus the eye positioned along a line in space marking the intersection of the two planes.

With the addition of a third alignment assembly spaced from and positioned at a desired orientation, the eye may be readily positioned in planes of symmetry of all three alignment assemblies and thus precisely positioned at a point in space marking the intersection of the three planes.

These and other objects, features and advantages of the invention will become more apparent when considered together with the following description and accompanying drawings in which.

Figure 10:
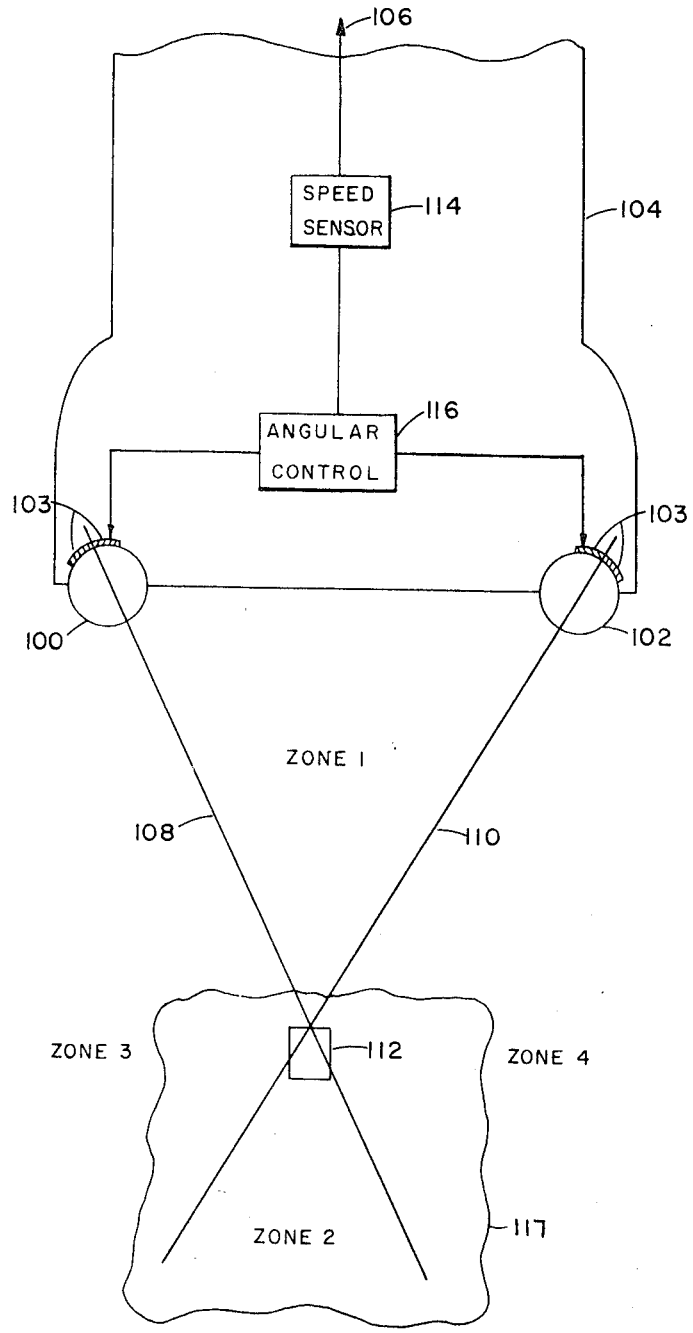
Figure 11:
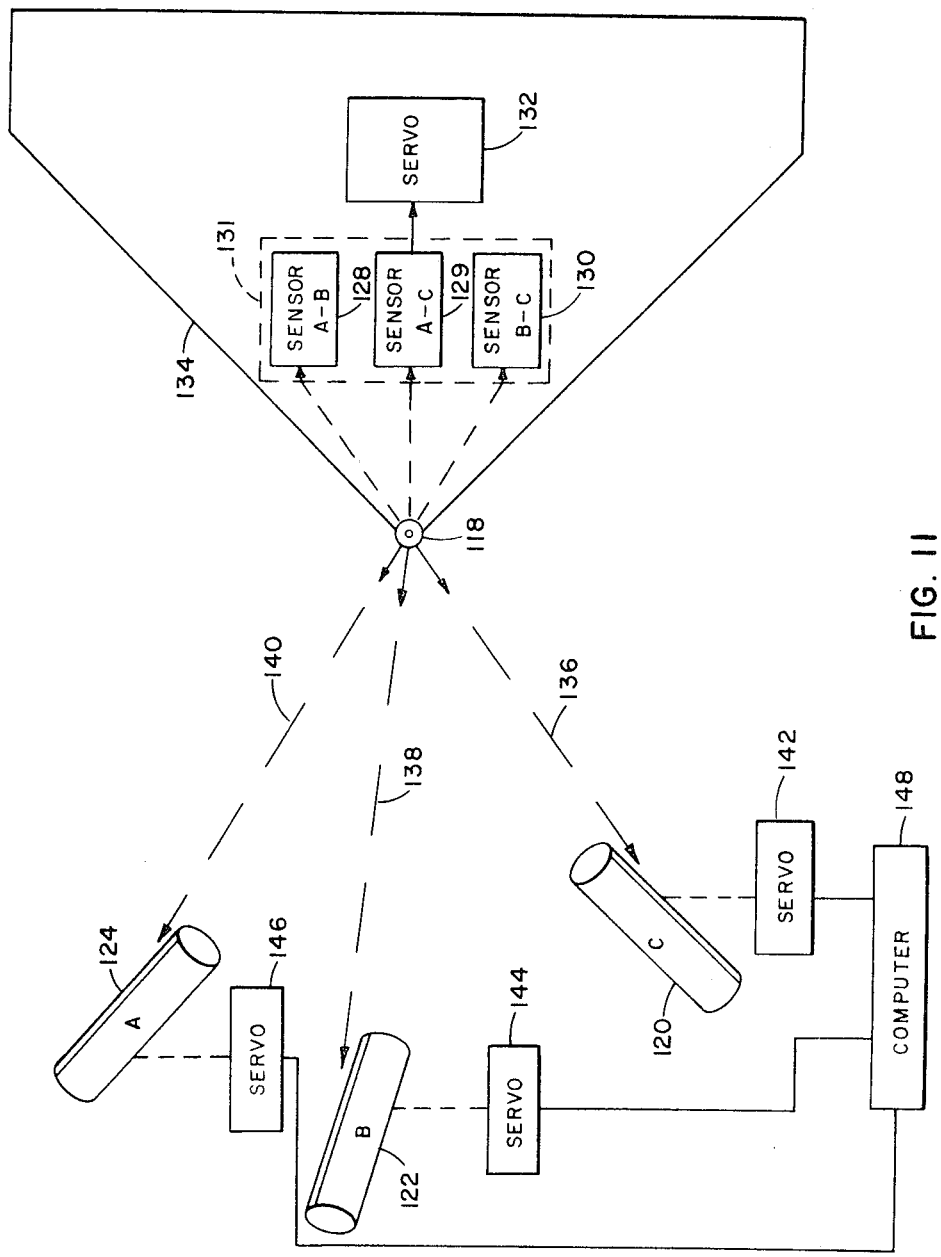

FIG. 10 illustrates an alignment system of this invention employing two alignment assemblies and particularly adapted to warn a viewer that the viewer has entered a critical region with respect to the alignment assemblies; and FIG. 11 is a schematic illustration showing an alignment system employing three alignment assemblies for locating a viewer's eye at a point in space with respect to the three alignment assemblies.

Figure 1:
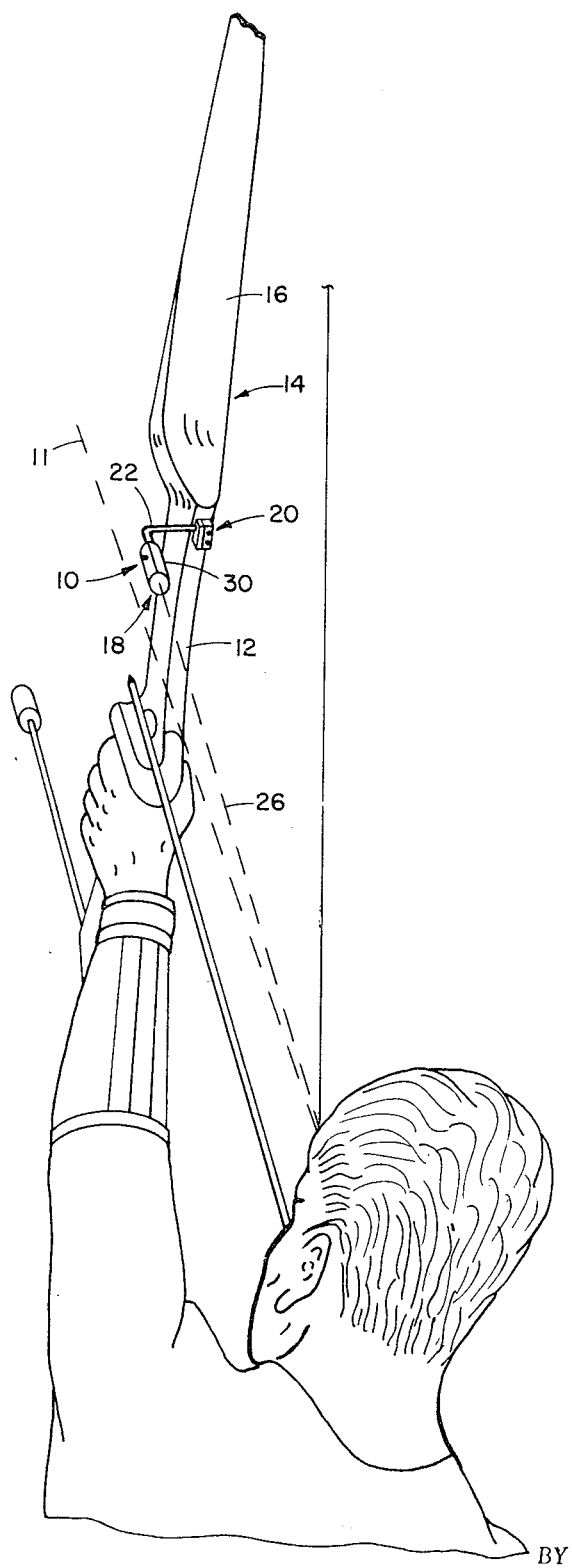
FIG. 1 is a pictorial view of the application of the invention to an archery bow.
Figure 2:
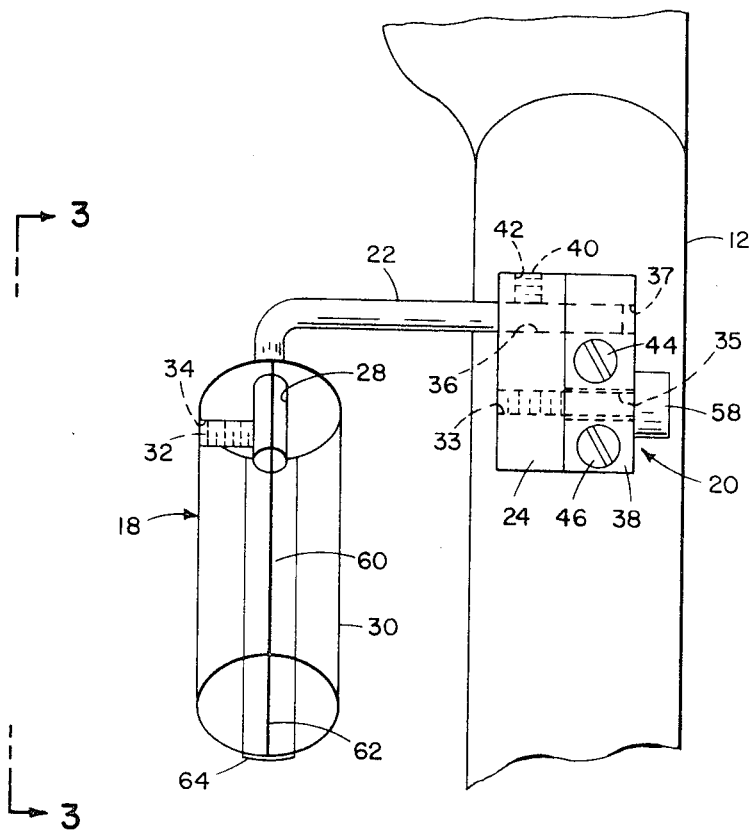
FIG. 2 is an enlarged frontal view of the invention as mounted on the archery bow shown in FIG. 1.
Figure 3:
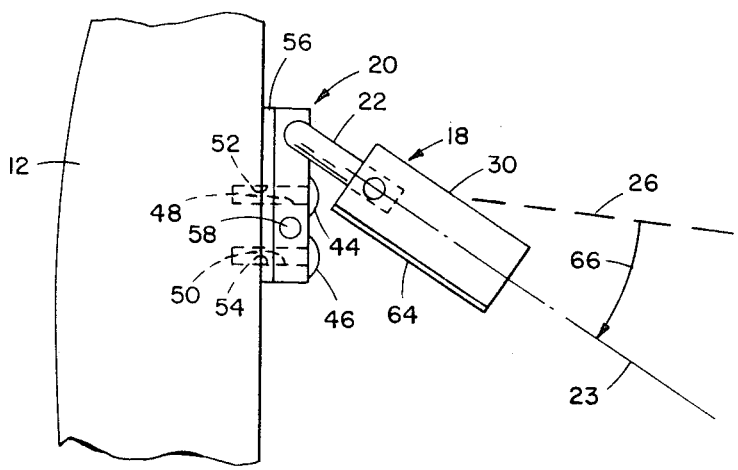
FIG. 3 is a left side view taken along the lines 3—3 of FIG. 2 showing the approximate inclination of the axis of the alignment assembly as attached to the bow of FIG. 1.

Referring now to FIGS. 1–3, a bow alignment system 10 is attached to a point on the upper portion of bow handle 12 of bow 14 just below the upper bow limb 16. Bow alignment system 10 consists of an alignment assembly 18 and bow mounting assembly 20. L-shaped rod 22 of mounting assembly 20 is rotatably mounted in mounting block 24 of mounting assembly 20. L-shaped or extension rod 22 enables alignment assembly 18 to be positioned slightly to the left of the archer's line of sight 26 to the target, and the longitudinal axis 23 of alignment assembly 18 to be inclined at a desired angle to the archer's line of sight 26 (FIGS. 1 and 3). Typically, the inclination would be in the range of 10° to 50°. The plane of symmetry of alignment assembly 18 is adjusted by means of rotatable connection between L-shaped member 22 and alignment assembly 18.

Referring now particularly to FIGS. 2–3, L-shaped rod 22 is inserted into a drilled hole 28 in the end of transparent cylinder 30. On being rotated to the desired orientation cylinder 30 is locked to L-shaped rod 22 by means of setscrew 32 in threaded hole 34 in cylinder 30. The opposite end of L-shaped rod 22 is inserted into and through drilled holes 36 and 37, respectively, in mounting blocks 24 and 38, being locked into position by means of setscrew 40 in tapped hole 42 of mounting block 24. Wood screws 44 and 46 pass freely through drilled holes 48 and 50 in mounting block 38 and through holes 52 and 54 in rubber mat 56 and screw into bow handle 12, permanently securing mounting block 38 to bow handle 12. Rubber mat 56 provides a cushioning or gasket effect between mounting blocks 24 and 38 and bow handle 12 permitting a substantially rigid coupling of mounting block 38 to bow handle 12 despite slight differences in surface contours. Mounting block 38 remains permanently affixed to the bow while permitting alignment assembly 18, locked in alignment to mounting block 24, to be readily removed, it being connected to mounting block 38 by means of locking bolt 58 which passes freely through drilled hole 35 in mounting block 38 and threads into threaded hole 33 in mounting block 24. The extension of rod 22 into mounting block 38 together with bolt 58 provide an aligned interconnection between mounting blocks 24 and 38 so that once rod 22 is locked into position by means of setscrew 40, the alignment assembly may be repeatedly removed and replaced without affecting the alignment of the system.

Cylinder 30 consists of a cylinder of clear solid material such as an acrylic plastic material, one such material being marketed under the trademark of Plexiglass. Two, thin, straight index markings or lines 60 and 62 are cut on opposite sides of the cylinder and lie within the plane of symmetry of the cylinder, which plane also includes the longitudinal axis 23 of the cylinder. A permanent black dye is smoothly distributed in line 60 and a permanent red dye in line 62. A white, or light colored, strip of tape 64 is fastened to the bottom surface of cylinder 30 over line 62 to provide a contrasting background between lines 60 and 62.

Actual adjustment of the alignment system by the archer is accomplished with setscrews 32 and 40 permitting cylinder 30 to be fully rotatable with respect to rod 22 and rod 22 to be freely rotatable in mounting block 24. As stated above, rod 22 is rotated in mounting blocks 24 and 38 so that the axis 23 of cylinder 30 and the archer's line of sight 26 form an acute angle 66 of typically 10 to 50 degrees. Next, cylinder 30 is rotated on rod 22 until line 60 on the upper surface of cylinder 30 is centered in the magnified reflection of line 62 which appears on the upper surface of cylinder 30 when viewed along the desired line of sight 26. The procedure is repeated for fine adjustment until lines 60 and 62 are aligned and a desired degree of magnification of line 62 achieved when viewed by the archer in his preferred shooting position. Setscrews 32 and 40 are then tightened and no further adjustment of the assembly is necessary. Lines 60 and 62 will be aligned only when the line of sight is in the plane of symmetry formed by lines 60 and 62, which the archer has previously chosen as a desired plane for his own shooting stance. Thereafter, even a slight deviation of the line of sight out of this plane is magnified and readily detectable.

Thus, the alignment assembly of this invention provides the archer with an extremely accurate aligned reference, a facility which he has not previously had available. A typical problem encountered by the archer which is largely remedied by the invention is that of torquing of the bow. This occurs when an archer first grips the bow and his hand attempts to rotate the bow handle slightly. When this occurs, there is rotation of alignment assembly 18, which is, of course, attached to the handle. Since movements of either axes 23 of the cylinder or the line of sight 26 out of the preset plane of symmetry will result in a magnified deflection of line 62 with respect to line 60, an error in positioning of the bow because of this torquing tendency can be immediately detected and eliminated.

Figure 4:
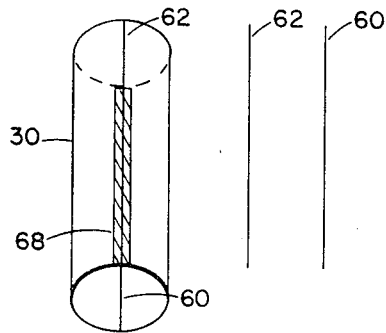
FIGS. 4–9 illustrate various configurations of indices for the alignment assembly of this invention.

FIGS. 4 to 9 illustrate various arrangements of index markings. In FIG. 4, the system also illustrated in FIGS. 2–3, both bottom index 62 and top index 60 are straight lines and cylinder 30 when viewed as discussed above presents a magnified image 68 of line 62.

Figure 5:
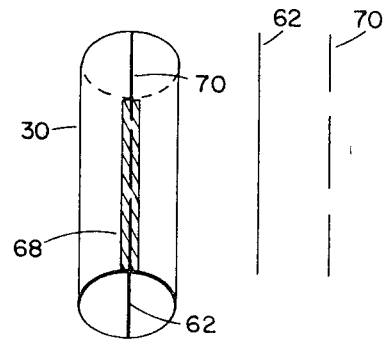
Figure 6:
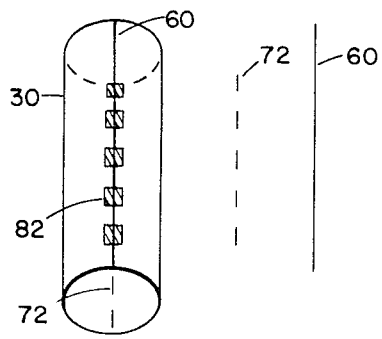

FIG. 5 illustrates a variation of the construction of FIG. 4 in that the bottom line 62 is solid and the top line 70 is a broken line. FIG. 6 differs in that the bottom line 72 is a broken line and the top line is a solid line 60.

Figure 7:
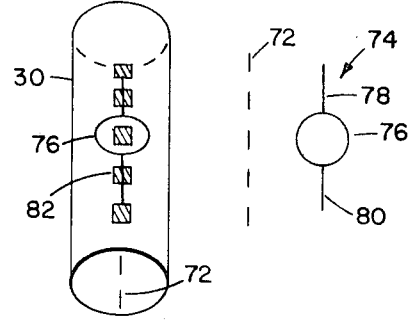

In FIG. 7, in addition to the bottom line 72 being a broken line, the top index 74 is an enclosed figure, in this case a circle 76 with two short lines 78 and 80 extending away from it, the lines being within the plane of symmetry. With this construction, the broken lines 72 create blocklike magnified figures 82 which can be readily centered with respect to top index circle 76 indicating alignment.

Figure 8:
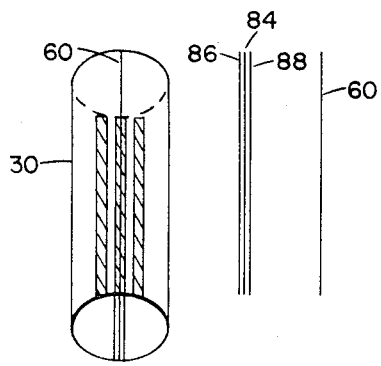

FIG. 8 illustrates an alignment assembly wherein there are three straight, parallel lines for the bottom index, the center one of which, line 84 is within the plane of symmetry, and the outer two lines, 86 and 88, are equally spaced from it. Thus, there appears on the top of the cylinder three magnified reference lines which assist in adjusting position for precise alignment.

Figure 9:
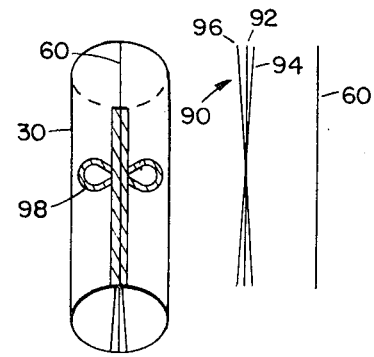

In FIG. 9, bottom index 90 consists of three crossed lines 90, wherein line 92 is within the plane of symmetry of the cylinder and lines 94 and 96 are diagonally positioned, at least where they cross, with respect to it, giving rise to the viewed pattern 98 when cylinder 30 is viewed along a line within the plane of symmetry. With departure from the plane the bow takes on a nonsymmetrical distorted pattern which is readily apparent. The bow pattern appears for viewing angles in the range of approximately 45° to 90°. For viewing angles smaller than that at which maximum distortion is experienced, occurring in the angular range 40° to 50°, the bow disappears and the magnified pattern is similar to the crossline pattern 90.

Where employing lines for the index markings, the range of values relating the width of a line to the radius of curvature of the cylinder should be substantially within the range of ratios of 0.80 to 0.0001. That:

$$0.0001 \leq \frac{\text{line width}}{\text{radius of curvature}} \leq 0.800$$

The degree of magnification and alignment sensitivity of the alignment assemblies are dependent upon the optical properties of the cylinder and the curvature of the surface in the region of concern, that is the region wherein the markings appear. For example, while the illustrations indicate round cylinders, it is to be appreciated that the curvatures need not be circular and the curves may be discontinuances. Also, the ends do not necessarily have to be parallel. For example, the top and bottom surfaces may be curved wholly or in part and the side surfaces of the cylinder may be flat or some other contour, the essential feature being that the surfaces which include the indexed markings are curved surfaces. Further, it is not necessary that the bottom and top surfaces be curved identically or that their radii be constant. It is, however, again to be noted that the magnification which is achieved depends upon curvature and may be varied by virtue of variations in radius of curvature.

The invention thus far has been described largely in terms of its application to single plane alignment and as applied to archery. However, it has application to multiple alignment and in many other fields. Thus, FIG. 10 is a schematic illustration of a biplanar alignment system employing alignment assemblies 100 and 102 mounted on a vehicle 104 which moves generally in the direction indicated by arrow 106. For example, vehicle 104 may be an automobile wherein alignment assemblies 100 and 102 are mounted, respectively, on each side of the rear of the automobile, and are viewable by a motorist in a vehicle following behind. In this application, the goal is to warn the driver behind when his vehicle is following too close for the speed of the vehicles. This condition exists and will be observed when the motorist in the following car reaches the position where he is within zone 1, the danger zone. Alignment assemblies 100 and 102 are arranged wherein the rear index markings 103 employ two colors, typically, red would be positioned on the outer sides of the planes of symmetry 108 and 110 as shown wherein any following motorist would observe a red color when looking at both alignment assemblies 100 and 102 and when in zone 1. The rear portion of alignment assemblies 100 and 102 on the opposite or inner sides of the planes of symmetry of each is colored green. If the motorist is in the region between extensions of the line of symmetry and labeled zone 2 he will not observe a red, or the danger indicated color when observing both alignment assemblies 100 and 102. On the other hand, if the motorist is to the left of zones 1 and 2 and thus in safe zones, he would not see a solid red in both alignment assemblies but would see a green in one alignment assembly and a red in the other and which, again, would not be a dangerous condition.

The driver or other optical sensing medium 112 shown in FIG. 12, as will be further discussed below, is shown at the intersection of planes 108 and 110 at which point identical color patterns are seen in both alignment assemblies, a condition which may be used for automatic positioning which will be further discussed below with respect to this aspect of the invention.

In order to adjust the system of FIG. 10 for varying speeds and thus a varying danger zone, expanding with speed, vehicle 104 is provided with speed sensor 114 which in turn energizes an angular control 116 which is coupled to alignment assemblies 100 and 102 to rotate them oppositely by an amount which is proportional to the rate of speed of vehicle 104 and of an amount sufficient to establish intersection of the planes of symmetry 108 and 110 at a safe following distance. Thus, a driver following behind would be warned if he came closer to vehicle 104 than the safe distance which is defined by zone 1.

While the invention has been described largely in terms of the eye of a person as the viewing instrument, it is to be appreciated that instead, an optical sensing medium 112 for example, may be a photoelectric device. In order to encompass both the eye of a person and an inanimate sensor, the expression observer is intended to refer to both. Where a photoelectric device is, the viewing object, it is necessary to construct the indices with such material that the viewing photoelectric device can distinguish the plane or planes of symmetry defined by 100 and 102. The system of FIG. 10 by providing a marking of one characteristic on one side of the plane of symmetry and a marking of a different characteristic on the other side of the plane of symmetry of each alignment assembly is thus compatible with either the eye or photoelectric sensing device. In FIG. 10, a green color is viewed on one side of the axis of symmetry 110; a red color on the other side of the axis of symmetry. Where viewing is from some distance and positioning is achieved by noting a change in viewed colors, it is often not necessary to provide an actual marking for the index on the viewed side as the latter index marking. Where, for example, it is a line would not be observable anyway.

By such a system the position of the optical sensing medium 112 may be directed to a position defined by the intersection of planes 108 and 110 and thus the system be used for positioning a body 117, to which optical medium 112 is related or affixed. In such a system the photoelectric sensor would direct movement of the body carrying it in corrective directions disclosed by the color combinations observed until the indicated position is reached. While passive colors for the indices markings are illustrated, the index areas may be lighted to provide for more effective or sensitive reception by the observing person or photoelectric device. This can be accomplished by either directly applying colored light or indirectly by means of colored reflectors.

FIG. 11 illustrates an application of the invention for the location or position of the eye of a person, or other viewing device as will be described below, at a point 118 in space with respect to three references, the three references being provided by three alignment assemblies 120, 122 and 124, appropriately positioned and oriented, each providing an indication of location within a distinct plane. Thus in achieving alignment with all three planes, which occurs at the intersection of the three planes, it is possible to define and thus locate a point in space to which the viewer can be directed.

Each of sensors 128, 129 and 130 observe two different combinations of alignment assemblies 120, 122 and 124, or A, B and C, and provide control signals to servo 132 which in turn controls the movement of vehicle 134 to maintain the position of sensor assembly 131, and thus vehicle 134, at the intersection of planes of symmetry 136, 138 and 140 of alignment assemblies 120, 122 and 124. By appropriate control of alignment assemblies 120, 122 and 124 by servos 142, 144 and 146, respectively, in turn controlled by computer 148, the orientation of the alignment assemblies may be selected to determine any desired planar intersection. By such a system there is provided, for example, means for guiding a vehicle 134 in space. In order to provide sufficient sensitivity the two colored index markers would be sources of coherent light such as provided by a laser.

It is to be appreciated that the three-dimensional control system first described would have many other applications, for example, many invention applications would exist in other three-dimensional areas, such as in the control of machine tools.

It is to be further appreciated that rearranging the colors on the back side of a cylinder would provide four combinations in a two-dimensional system and eight combinations in a three-dimensional system, providing equally as many combinations in the viewing zones. The important consideration is that the color combination selected and thus, the color combination observable in a particular zone or location, be meaningful to the observer, whether a person or a photoelectric device.

The particular color combination suggested above is a natural choice of one such combination.

It is believed that by means of this invention that there has been provided an improved system of optical alignment wherein alignment can be readily achieved in a single plane, along a line marking the intersection of two planes or at a point which is the intersection of three planes, and by virtue of the image magnification which it provides, it is possible to obtain extremely accurate results without the necessity of elaborate or complex apparatus.

What is claimed is:

1. An alignment system (for determining when a viewing object is within at least one plane,) comprising at least one alignment assembly (in turn) comprising:

A. an elongated cylinder of transparent material having a longitudinal axis (at least) and first and second elongated diametrically opposite surface regions, said second surface region being (a curved surface region having a convex curvature) convexly curved with respect to said axis and extending symmetrically (and perpendicularly from a straight line, said straight line being parallel to the longitudinal axis of said cylinder;) about a plane which includes said axis;

B. a first index comprising a visible marking extending longitudinally along said cylinder (and within said first surface region;) on said first surface region and being symmetrical about said plane, and C. a second index (defined by said straight line extending) positioned (longitudinally along said cylinder) at the intersection of said second surface region and said plane, whereby said (one) plane (is indicated by a plane of symmetry in alignment with the longitudinal axis of said cylinder, said first index, and said second index, and whereby said first index is magnified by said curved surface of said second surface region when said first index is viewed through said second surface region) can be aligned to include an observer by aligning said first and second indexes with said observer, and wherein said second surface region is sufficiently curved to give a visible magnification to said first index when said first and second indexes and said observer are aligned.

2. An alignment system as set forth in claim 1 further comprising a second said alignment assembly, said second alignment assembly being positioned whereby (said viewing object is determinable to be along) the condition of alignment of said viewing object with respect to a line corresponding to the intersection of said planes of symmetry of said alignment assembly and said second alignment assembly can be determined.

3. An alignment system as set forth in claim 1 wherein said first surface region is a convex curved surface region having a surface parallel to the longitudinal axis of said cylinder.

4. An alignment system as set forth in claim 2 further comprising a third said alignment assembly wherein said alignment assemblies are separated and oriented wherein the planes of symmetry of said alignment assembly; said second alignment assembly and said third alignment assembly intersect at a point in space whereby a viewing body may be precisely positioned at said point in space by observation of said alignment assemblies.

5. An alignment system as set forth in claim 1 wherein said first index comprises at least two visible lines, which two lines cross at a point within said plane of symmetry.

6. An alignment system as set forth in claim 1 wherein said first and second indices each comprises at least one straight line formed in said first curved surface region and within said plane of symmetry respectively.

7. An alignment system as set forth in claim 1 wherein said second index is a visible line formed in said second surface and within said plane of symmetry.

8. An alignment system as set forth in claim 7 wherein said first index comprises a plurality of lines symmetrically positioned with respect to said plane of symmetry and wherein at least one of said lines is within said plane of symmetry.

9. An alignment system as set forth in claim 8 wherein there are at least three lines and said lines are parallel.

10. An alignment system as set forth in claim 8 wherein at least two of said lines intersect a third said line at a point within said plane of symmetry.

11. An alignment system as set forth in claim 6 wherein said second index comprises an enclosed visible figure symmetrically positioned at said second surface and symmetrically positioned with respect to said plane of symmetry.

12. An alignment system as set forth in claim 11 wherein said first index is a broken visible line.

13. An alignment system as set forth in claim 1 further comprising mounting means for mounting a said alignment assembly upon an implement.

14. An alignment system as set forth in claim 13 wherein said means for mounting comprises means for selectively orienting said alignment wherein a selected reference plane is provided and a reference for a viewing body in space with respect to said implement.

15. An alignment system as set forth in claim 14 wherein said means for mounting comprises means for rotating said cylinder with respect to its longitudinal axis.

16. An alignment system as set forth in claim 15 wherein said means for mounting comprise:
   A. first mounting means connected to a said alignment assembly and including means for selectively orienting a said alignment assembly with respect to said first mounting means and including first position locking means;
   B. second mounting means including means for permanently mounting said second mounting means to an implement and including second position locking means for mating with said first locking means of said first mounting means wherein when said first and second mounting means are interconnected the orientation of said alignment assembly is maintained with repeated removal and attachment of said first mounting means to said second mounting means;
   C. fastening means for rigidly fastening together said first and second mounting means.

17. An alignment system as set forth in claim 14 wherein said first mounting means include an L-shaped member and an attachment member, one end of said L-shaped member being affixed axially to one end of a said cylinder and the other end of said L-shaped member being adjustably affixed to said attachment member wherein said cylinder can be oriented with respect to said attachment member wherein said cylinder can be oriented with respect to said attachment member, and, said fastening means interconnects said attachment member and said second mounting means.

18. An alignment system as set forth in claim 14 further comprising an archery bow and said implement is said archery bow.

* * * * *